(12) United States Patent
Thetford et al.

(10) Patent No.: US 7,008,988 B2
(45) Date of Patent: Mar. 7, 2006

(54) PAINT COMPOSITIONS

(75) Inventors: Dean Thetford, Blackley (GB); John David Schofield, Blackley (GB)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 10/472,140

(22) PCT Filed: Jan. 17, 2002

(86) PCT No.: PCT/GB02/00187

§ 371 (c)(1),
(2), (4) Date: Jan. 23, 2004

(87) PCT Pub. No.: WO02/077111

PCT Pub. Date: Oct. 3, 2002

(65) Prior Publication Data

US 2004/0116568 A1     Jun. 17, 2004

(30) Foreign Application Priority Data

Mar. 22, 2001 (GB) .................................. 0107183

(51) Int. Cl.
*C08J 3/00*    (2006.01)
*C08K 5/09*    (2006.01)
*C08L 51/00*    (2006.01)
*C08L 67/00*    (2006.01)

(52) U.S. Cl. ...................................... 524/322; 524/539
(58) Field of Classification Search ................ 524/322, 524/539
See application file for complete search history.

(56) References Cited

U.S. PATENT DOCUMENTS 5,700,395 A * 12/1997 Thetford et al. .............. 516/31

FOREIGN PATENT DOCUMENTS

| WO | WO 94/21368 | 9/1994 |
|----|-------------|--------|
| WO | WO 95/17473 | 6/1995 |
| WO | WO 98/19784 | 5/1998 |
| WO | WO 99/55763 | 11/1999 |
| WO | WO 00/24503 | 5/2000 |

* cited by examiner

*Primary Examiner*—Patrick D. Niland
(74) *Attorney, Agent, or Firm*—Samuel B. Laferty; Paul N. Kokulis

(57) ABSTRACT

A paint comprising a film-forming resin, an organic liquid, a pigment and a dispersant of formula 1, including salts thereof $$(T\text{-}(O\text{-}A\text{-}CO)_n(O\text{-}B\text{-}CO)_m)_p Z$$

wherein T is H or a polymerisation terminating group; A is $C_{16\text{-}20}$-alkenylene; B is $C_{10\text{-}20}$-alkylene; Z is the residue of a polyamine or polyimine; n is 2 to 50; m is 0 to 25; and p is not less than 2. Preferred dispersants are derived from poly(ricinoleic acid) and polyethylene imine.

10 Claims, No Drawings

PAINT COMPOSITIONS

The present invention relates to paints and mill-bases for paints containing an organic liquid, pigment, film-forming binder resin and dispersant which is derived from a $C_{16\text{-}20}$ alkenyl hydroxycarboxylic acid and a polyamine or polyimine.

WO 95/17473 discloses a method for preparing a non-aqueous dispersion of copper phthalocyanine (CuPc) which comprises milling crude CuPc in a high boiling liquid at a temperature from 50 to 150° C. in the presence of a polyesteramine dispersant. The dispersion is particularly suitable for direct incorporation into a printing ink. The polyester is preferably poly(ricinoleic acid), poly (6-hydroxycaproic acid) and especially poly(12-hydroxystearic acid) hereinafter PRA, PCA and PHS respectively. Specific dispersants are PHS reacted with dimethylaminopropylamine which is quaternised with dimethylsulphate and PHS reacted with a polyalkyleneimine (hereinafter PAI) such as polyethyleneimine (hereinafter PEI). The amount of PHS is up to 50, preferably up to 30, more preferably up to 10 and especially up to 5 parts PHS for each part of PAI.

WO 00/24503 discloses dispersants containing a polyester chain derived from a $C_{8\text{-}20}$-linear alkylene or alkenylene hydroxycarboxylic acid reacted with a polyamine or polyimine wherein the ratio of polyester to polyamine or polyimine is from 5:1 to 20:1. The specific polyester chains are all derived from 12-hydroxystearic acid.

It has now been found that dispersants derived from unsaturated hydroxycarboxylic acids exhibit greater fluidity than dispersants derived from analogous saturated hydroxycarboxylic acids and that this allows for easier handling. Paints containing a dispersant derived from an unsaturated hydroxycarboxylic acid also exhibit other advantages compared with those paints where the dispersant is derived from a saturated hydroxycarboxylic acid, such as better adhesion to metal surfaces and improved hardness of the paint-film.

Thus, according to the present invention there is provided a paint or mill-base comprising a film-forming resin, an organic liquid, a pigment and a dispersant of formula 1, including salts thereof.

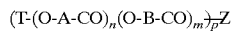

(T-(O-A-CO)$_n$(O-B-CO)$_m$)$_p$-Z    1 wherein

T is H or a polymerisation terminating group;
A is $C_{16\text{-}20}$-alkenylene;
B is $C_{10\text{-}20}$-alkylene;
Z is the residue of a polyamine or polyimine;
n is 2 to 50;
m is 0 to 25; and
p is not less than 2.

The polymer chain represented by T-(O-A-CO)$_n$ (O-B-CO)$_m$— may be block or preferably random. It should be noted that either the moiety represented by —(O-A-CO)— or —(O-B-CO)— may be attached to T.

Preferably the ratio of n to m is not less than 2:1, more preferably not less than 4:1 and especially not less than 10:1. It is particularly preferred that m is 0.

When T is a polymerisation terminating group, it is preferably the residue of a carboxylic acid of formula T'-COOH wherein T' may be aromatic, heterocyclic, alicyclic or preferably aliphatic which is optionally substituted by halogen, $C_{1\text{-}4}$-alkoxy, hydroxy and/or ether groups. Preferably, T' is unsubstituted. When T' is aliphatic, it may be linear or branched, saturated or unsaturated but is preferably linear, saturated alkyl.

The total number of carbon atoms in T can be as high as 50 but it is preferred that T contains not less than 8, more preferably not less than 12 and especially not less than 14 carbon atoms. It is also preferred that T contains not greater than 30, more preferably not greater than 25 and especially not greater than 20 carbon atoms.

Preferably (O-A-CO) is the residue of ricinoleic acid.

B is preferably $C_{10\text{-}16}$-alkylene. Examples of hydroxycarboxylic acids from which —(O-B-CO) is derivable are 12-hydroxydodecanoic acid, 5-hydroxydodecanoic acid, 5-hydroxydecanoic acid, 4-hydroxydecanoic acid and especially 12-hydroxystearic acid.

n+m is preferably not less than 2. It is also preferred that n+m is not greater than 10 and especially not greater than 6.

The integer p is preferably not greater than 2000 and especially not greater than 1000.

The weight ratio of T-(O-A-CO)$_m$ (O-B-CO)$_n$ to Z is preferably from 8:1 to 30:1 and especially from 8:1 to 20:1.

Z is preferably the residue of polyallylamine, polyvinylamine, more preferably poly($C_{2\text{-}4}$-alkyleneimine) (hereinafter PAI) and particularly poly(ethyleneimine) (PEI).

Linear polyethyleneimines can be prepared by hydrolysis of poly (N-acyl) alkyleneimines as described by Takeo Saegusa et al in Macromolecules, 1972, Vol. 5, page 4470. Branched polyethyleneimines of differing molecular weight are available from BASF and Nihon Shokubai. Polyallylamine and poly (N-alkyl) allylamines of differing molecular weight are available from Nitto Boseki. Polyvinylamines are available from Mitsubishi Kasei. Poly (propyleneimine) dendrimers are available from DSM Fine Chemicals and poly (amidoamine) dendrimers are available as "Starburst" dendrimers from Aldrich Chemical Company.

The PAI may be linear or branched.

The polyamine or polyimine preferably has a weight-average molecular weight from 500 to 600,000, more preferably from 1,000 to 200,000, even more preferably from 1,000 to 100,000 and especially from 1,000 to 70,000.

The dispersant is obtainable by reacting the polyamine or polyimine with two or more polyoxyalkenylenecarbonyl (hereinafter POAC) chains containing a free carboxylic acid of formula 2

T-(O-A-CO)$_n$(O-B-CO)$_m$—OH    (2)

wherein T, A, B, n and m are as defined hereinbefore. The acid of formula 2 is hereinafter referred to as a TPOAC acid.

Whereas it is preferred to prepare the dispersant by reacting a TPOAC acid with a polyamine or polyimine, the dispersant may also be prepared by reacting the polyamine or polyimine with a hydroxy carboxylic acid and subsequently reacting the free hydroxy group with more hydroxy carboxylic acid in order to build the POAC chain.

Some commercial sources of hydroxy carboxylic acids contain carboxylic acids which are free from hydroxy groups as an impurity. Consequently, when such sources of hydroxy carboxylic acids are used to prepare the dispersants it is not necessary to add a separate polymerisation terminating compound since the carboxylic acid which is free from hydroxy groups can fulfil this function.

The dispersants are obtainable by reacting the polyamine or polyimine with a TPOAC acid at a temperature between 50 and 250° C. and preferably in an inert atmosphere. Preferably, the temperature is not less than 80° C. and especially not less than 100° C. In order to minimise charring of the dispersant, the temperature is preferably not greater than 150° C.

The TPOAC acid may be prepared using similar conditions to those employed when reacting the TPOAC acid with the polyamine or polyimine. However, it is preferred to include an esterification catalyst such as a tetra-alkyl titanate, for example tetrabutyltitanate, a zinc salt of an organic acid, for example zinc acetate, a zirconium salt of an aliphatic alcohol, for example zirconium isopropoxide, toluene sulphonic acid or a strong organic acid such as a halo acetic acid, for example trifluoro acetic acid. The polymerisation is generally carried out at temperatures between 150 and 180°C.

When the dispersant is prepared by reacting the polyamine or polyimine with a hydroxy carboxylic acid, the reaction conditions employed are preferably the same as those used for reacting a TPOAC acid with a polyamine or polyimine. Subsequent building of the POAC chain is preferably carried out under conditions similar to those used for preparing the TPOAC acid.

The inert atmosphere may be provided by any gas which does not react with the dispersant or with the starting materials and includes the inert gases of the Periodic Table and especially nitrogen.

Particularly useful effects have been obtained with dispersants of formula 1 wherein the TPOAC acid is obtained from ricinoleic acid, optionally containing 12-hydroxystearic acid and optionally containing stearic acid as polymerisation terminating group with a number-average molecular weight between 800 and 2,000 and Z is the residue of PEI having a number-average molecular weight of from 1,000 to 70,000.

According to a still further aspect of the invention there is provided a dispersion comprising a dispersant of formula 1, a pigment solid and an organic medium.

The pigment may be from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone, perylene, diketopyrrolopyrrole and phthalocyanine series, especially copper phthalocyanine and its nuclear halogenated derivatives, and also lakes of acid, basic and mordant dyes. Carbon blacks, although strictly inorganic, behave more like organic pigments in their dispersing properties. Preferred organic pigments are phthalocyanines, especially copper phthalocyanines, monoazos, disazos, indanthrones, anthranthrones, quinacridones and carbon blacks.

The organic medium present in the paint or mill-base is preferably a polar organic medium or a substantially non-polar aliphatic or aromatic hydrocarbon or halogenated hydrocarbon including mixtures thereof. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39–40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, and halogenated aliphatic and aromatic hydrocarbons, such as trichloro-ethylene, perchloroethylene and chlorobenzene and particularly aliphatic and aromatic hydrocarbons, especially those having at least 6 carbon atoms, such as refinery distillation products and by-products, aliphatic solvents, mineral oils, white spirit and mineral spirits including mixtures thereof.

Examples of suitable resins, as the medium for the dispersion form of the present invention, are film-forming resins such as are suitable for the preparation of paints and chips for use in various applications such as paints. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, medium oil alkyd, long oil alkyd, nitro cellulose and multi-media resins such as acrylic and urea/aldehyde.

If desired, the dispersions may contain other ingredients, for example resins (where these do not already constitute the organic medium) binders, fluidising agents (such as those described in GB-A-1508576 and GB-A-2108143), anti-sedimentation agents (such as those described in WO 96/14344), plasticisers, levelling agents and preservatives.

Preferably, the organic medium is a substantially non-polar organic liquid and especially an aliphatic or aromatic hydrocarbon, or mixture thereof.

The dispersions typically contain from 5 to 95% by weight of the pigment, the precise quantity depending on the nature of the pigment and the quantity depending on the relative densities of the pigment and the organic medium. Preferably the dispersion contains from 15 to 60% by weight of the pigment.

The dispersion may be obtained by any of the conventional methods known for preparing dispersions. Thus, the pigment, the organic medium and the dispersant may be mixed in any order, the mixture then being subjected to a mechanical treatment to reduce the particles of the pigment to an appropriate size, for example by ball milling, bead milling, gravel milling or plastic milling until the dispersion is formed. Alternatively, the pigment may be treated to reduce its particle size independently or in admixture with either the organic medium or the dispersant, the other ingredient or ingredients then being added and the mixture being agitated to provide the dispersion.

When the pigment is milled in the presence of dispersant and organic liquid the temperature is preferably not greater than 40° C. and especially not greater than 30° C.

The paint or mill-base contains at least 0.2%, more preferably at least 0.5% and especially at least 1.0% dispersant based on weight of the pigment. Preferably the paint or mill-base contains not greater than 100%, preferably not greater than 50%, more preferably not greater than 20% and especially not greater than 10% dispersant by weight based on the weight of pigment.

Typically, the mill-base contains from 10 to 70% by weight pigment based on the total weight of the mill-base. Where the pigment is an organic pigment the mill-base preferably contains from 20 to 50% by weight. Where the pigment is an inorganic pigment the mill-base preferably contains from 40 to 70% by weight except where the pigment is a transparent iron oxide. For transparent iron oxides the mill-base preferably contains from 20 to 50% by weight. Where the pigment is a carbon black the mill-base preferably contains from 10 to 60% by weight. The pigment loading depends on surface area, with high surface area giving low pigment loadings and vice versa.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of pigment but is preferably from 0.5 to 5% by weight of the mill-base.

The invention is further illustrated by the following example wherein all references are to parts by weight unless expressed to the contrary.

EXAMPLE 1

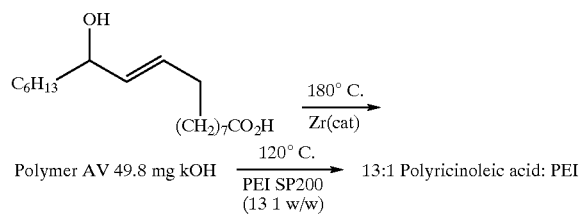

Ricinoleic Acid: ACROS: 100 g
Zirconium-n-butylate: Fluka: 0.2 g, catalytic amount
Polyethyleneimine (PEI) SP 200: ex Nippon Shokubai: 7.66 g Ricinoleic acid (100 g) was heated to 180° C. (oil bath temperature 200° C.) and zirconium-n-butylate added. Heating and rapid stirring under an $N_2$ atmosphere was continued for 7 hours after which the resultant poly(ricinoleic acid) exhibited an Acid Value of 49.8 mg KOH/g. The reaction mixture was then cooled to 90° C. (oil bath temperature) and PEI added (the PEI was warmed to 90° C. before addition to the reaction). The reaction was stirred at 90° C. for 5 minutes then heated to 120° C. After reaching 120° C. (oil bath temperature) the reaction was stirred at 120° C. (oil bath temperature) for a further 17 hours (NB The $N_2$ flow was increased to help remove water formed). The product was formed as a golden thick syrup. This is Dispersant 1.

EXAMPLES 2 to 12

Example 1 was repeated except using the amounts of poly(ricinoleic acid) (PRA) and polyethylene amine indicated in the following Table 1. The dispersants were all obtained as clear golden yellow fluid liquids.

TABLE 1

| Example | Dispersant | Polyester | PEI | Weight ratio of Polyester to PEI |
|---|---|---|---|---|
| 2 | 2 | PRA, 2100 | SP 200 | 20:1 |
| 3 | 3 | PRA, 1040 | SP 200 | 20:1 |
| 4 | 4 | PRA, 1770 | SP 200 | 12:1 |
| 5 | 5 | PRA, 1500 | SP 200 | 8:1 |
| 6 | 6 | PRA, 1770 | SP 200 | 3:1 |
| 7 | 7 | PRA, 1770 | SP 018 | 8:1 |
| 8 | 8 | PRA, 2400 | SP 050 | 3:1 |
| 9 | 9 | RA/HAS (1:1), 1727 | SP 200 | 20:1 |
| 10 | 10 | RA/HAS (1:1), 1727 | SP 200 | 14:1 |
| 11 | 11 | PRA, 1100 | SP 200 | 15:1 |
| 12 | 12 | PRA, 1100 | SP 200 | 18:1 |

Footnote to Table 1:

PRA is poly(ricinoleic acid) and the number following is the number average molecular weight.

RA is ricinoleic acid.

HAS is 12-hydroxystearic acid.

Examples 9 and 10 used a 1:1 molar ratio of ricinoleic acid and 12-hydroxystearic acid.

SP 200 is PEI ex Nippon Shokubai with average molecular weight of 10,000.

SP 018 is PEI ex Nippon Shokubai with average molecular weight of 1,800.

SP 050 is PEI ex Nippon Shokubai with average molecular weight of 5,000.

EXAMPLES 13 to 22

The viscosity of the dispersants was measured at 20° C. using a TA Instruments viscometer fitted with a 2 cm steel plate at a 50 micron gap. The results are given in Table 2 below. These data show that the dispersants according to the invention exhibit markedly superior fluidity compared with dispersants where the polyester chain is derived from a saturated hydroxy carboxylic acid.

TABLE 2

| Example | Dispersant | | | | | | | |
|---|---|---|---|---|---|---|---|---|
| 13 | 2 | 1/s | 5.466 | 10.46 | 21.02 | 31.55 | 42.10 | 47.47 |
| | | Pas | 130.9 | 128.3 | 120.3 | 115.5 | 111.7 | 110.1 |
| 14 | 3 | 1/s | 7.323 | 20.5 | 18.03 | 28.65 | 44.59 | 49.98 |
| | | Pas | 12.66 | 20.10 | 20.12 | 20.17 | 20.38 | 20.41 |
| 15 | 4 | 1/s | 5.367 | 10.13 | 20.21 | 30.54 | 41.24 | 128.7 |
| | | Pas | 131.8 | 134.0 | 132.8 | 131.5 | 46.98 | 126.2 |
| 16 | 6 | 1/s | 4.518 | 179.9 | 19.10 | 29.19 | 39.37 | 44.61 |
| | | Pas | 9.308 | 172.5 | 171.4 | 170.6 | 171.6 | 170.1 |
| 17 | 7 | 1/s | 6.889 | 11.79 | 22.25 | 33.07 | 43.53 | 49.00 |
| | | Pas | 71.19 | 68.29 | 67.28 | 65.61 | 64.52 | 64.67 |
| 18 | 8 | 1/s | 4.778 | 9.336 | 19.15 | 29.73 | 39.71 | 44.62 |
| | | Pas | 9.336 | 169.0 | 167.6 | 162.7 | 162.8 | 163.8 |
| 19 | 9 | 1/s | 5.941 | 10.91 | 21.57 | 31.93 | 42.45 | 47.75 |
| | | Pas | 101.8 | 100.3 | 98.31 | 97.39 | 96.47 | 95.69 |
| 20 | 10 | 1/s | 5.197 | 9.937 | 20.36 | 30.69 | 41.26 | 46.45 |
| | | Pas | 139.3 | 139.2 | 134.2 | 133.1 | 130.8 | 130.3 |
| 21 | 11 | 1/s | 6.728 | 11.91 | 22.49 | 32.97 | 43.61 | 48.94 |
| | | Pas | 64.87 | 64.39 | 63.69 | 63.57 | 63.12 | 62.94 |
| 22 | 12 | 1/s | 7.121 | 12.41 | 23.02 | 33.62 | 44.36 | 49.66 |
| | | Pas | 43.04 | 42.83 | 42.96 | 42.69 | 42.27 | 42.11 |
| | Control | 1/s | 4.38 | 11.13 | 19.58 | 29.26 | 35.04 | — |
| | | Pas | 595.9 | 556.0 | 523.8 | 493.6 | 473.0 | — |

Footnote to Table 2
1/s is shear rate.
Pas is viscosity.
Control is 10:1 w/w PHS (MW 1600):PEI (SP 200).

The invention claimed is:

1. A paint comprising a film-forming resin, an organic liquid, a pigment and a dispersant of formula 1, including salts thereof

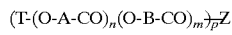

$$(T\text{-}(O\text{-}A\text{-}CO)_n(O\text{-}B\text{-}CO)_m)_p Z$$

wherein
T is H or a polymerisation terminating group;
A is $C_{16-20}$-alkenylene;
B is $C_{10-20}$-alkylene;
Z is the residue of a polyamine or polyimine;
n is 2 to 50;
m is 0 to 25; and
p is not less than 2.

2. A paint as claimed in claim 1 wherein the ratio of n to m is not less than 2:1.

3. A paint as claimed in either claim 1 or claim 2 wherein m is 0.

4. A paint as claimed in claim 1 or 2 wherein —(O-A-CO) is the residue of ricinoleic acid.

5. A paint as claimed in claim 1 or 2 wherein the number of carbon atoms in T is not less than 8 and not greater than 20.

6. A paint as claimed in claim 1 or 2 wherein n+m is not greater than 10.

7. A paint as claimed in claim 1 or 2 wherein p is not greater than 1000.

8. A paint as claimed in claim 1 or 2 wherein the ratio of T-(O-A-CO)$_m$ (O-B-CO)$_n$— to Z is from 8:1 to 30:1.

9. A paint as claimed in claim 1 or 2 wherein Z is the residue of polyethyleneimine.

10. A paint as claimed in claim 1 wherein m is 0, —(O-A-CO) is the residue of ricinoleic acid, the number of carbon atoms in T is not less than 8 and not greater than 20, n+m is not greater than 10, p is not greater than 1000, the ratio of T-(O-A-CO)$_m$ (O-B-CO)$_n$— to Z is from 8:1 to 30:1 and Z is the residue of polyethyleneimine.

* * * * *